US012715216B2

(12) United States Patent
Manabe et al.

(10) Patent No.: US 12,715,216 B2
(45) Date of Patent: Aug. 25, 2026

(54) METHOD FOR MANUFACTURING LIQUID EJECTION HEAD AND LIQUID EJECTION HEAD

(71) Applicant: CANON KABUSHIKI KAISHA, Tokyo (JP)

(72) Inventors: Takanobu Manabe, Kanagawa (JP); Junichiro Iri, Kanagawa (JP); Naoyuki Kamano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/405,829

(22) Filed: Jan. 5, 2024

(65) Prior Publication Data

US 2024/0239104 A1 Jul. 18, 2024

(30) Foreign Application Priority Data

Jan. 16, 2023 (JP) ................................. 2023-004189

(51) Int. Cl.
*B41J 2/16* (2006.01)
*B28D 5/00* (2006.01)

(52) U.S. Cl.
CPC ........... *B41J 2/1635* (2013.01); *B28D 5/0011* (2013.01); *B41J 2/162* (2013.01); *B41J 2/1629* (2013.01); *B28D 5/0035* (2013.01)

(58) Field of Classification Search
CPC ........ B41J 2/1635; B41J 2/162; B41J 2/1629; B41J 2/1603; B41J 2/1623; B41J 2/1628; B41J 2/1632; B41J 2/1634; B41J 2/1639; B41J 2/1645; B28D 5/0011; B28D 5/0035; B28D 5/022
See application file for complete search history.

(56) References Cited

U.S. PATENT DOCUMENTS 8,108,998 B2 * 2/2012 Inada ................ B23K 26/0853
438/460

FOREIGN PATENT DOCUMENTS

JP 2006281679 A 10/2006
JP 2022027112 A 2/2022

* cited by examiner

*Primary Examiner* — Lisa Solomon
(74) *Attorney, Agent, or Firm* — Canon U.S.A., Inc. IP Division

(57) ABSTRACT

A method for manufacturing a liquid ejection head including an element substrate having an ejection port forming member including an ejection port and an energy generating element for supplying energy for ejecting liquid to the ejection port includes preparing a wafer having the energy generating element and the ejection port forming member on a first surface, forming a recessed portion in a second surface, and cutting the wafer. The wafer is cut along cutting lines provided on the first surface to form element substrates and including a first cutting line and a second cutting line intersecting the first cutting line. The recessed portion is formed at a position overlapping the cutting lines except in an intersection portion of the first and second cutting lines. In the intersection portion, the recessed portion is formed corresponding to only one of the first cutting line and the second cutting line.

13 Claims, 8 Drawing Sheets

METHOD FOR MANUFACTURING LIQUID EJECTION HEAD AND LIQUID EJECTION HEAD

BACKGROUND

Field

The present disclosure relates to a method for manufacturing a liquid ejection head used in a liquid ejection type recording apparatus, such as an inkjet printer, and a liquid ejection head.

Description of the Related Art

A liquid ejection type recording apparatus, such as an inkjet printer, typically may use a manufactured liquid ejection head that prints on a sheet. For example, Japanese Patent Application Laid-Open No. 2006-281679 discloses a method for manufacturing a liquid ejection head in which a burr portion that has failed to be cut in cutting using a dicing blade is prevented from becoming a dust defect. Japanese Patent Application Laid-Open No. 2022-27112 discusses a method for manufacturing a liquid ejection head in which a recessed portion is not provided in a region of a cutting line, i.e., the recessed portion is not provided in a portion where vertical and horizontal cutting lines intersect each other.

An element substrate constituting an ejection unit of a liquid ejection head, such as an inkjet head, is manufactured by a manufacturing method similar to a semiconductor manufacturing process. More specifically, after patterns of an ejection port portion, an energy generating element, and the like are formed in units of several tens to several hundreds on a wafer of about φ3 to φ8 inches by a thin film process using a photolithography technique, the wafer is cut into individual element substrates. As an example of a method of cutting the wafer at this time, there is a method of scratching the wafer with a diamond having a sharp tip and then applying a bending force or a tensile force to the wafer to cut the wafer.

However, in this method, dimensional accuracy is very poor, and chipping frequently occurs, and therefore, it is extremely difficult to control the bending force and the tensile force applied to the wafer.

In some conventional methods for manufacturing a liquid ejection head, wet etching is used to form a recessed portion in a wafer where a dicing blade cuts into a wafer until the dicing blade extends into the recessed portion to prevent a burr portion from becoming a dust defect. However, it is not easy to form the recessed portion corresponding to a cutting line on a back surface of the wafer with high accuracy by wet etching. In particular, since an etching surface becomes complicated at a portion where cutting lines extending vertically and horizontally intersect, it is extremely difficult to control the dimensions of the recessed portion and form the recessed portion with high accuracy. If the dimensional accuracy of the recessed portion on the back surface of the wafer is poor, an outer shape of the element substrate constituting the ejection unit of the liquid ejection head becomes unstable, the performance of the liquid ejection head is deteriorated, and a production yield of the liquid ejection head is lowered.

A method for stabilizing a shape of the recessed portion by avoiding the shape of the recessed portion formed by etching in an intersection portion of the cutting lines from becoming complicated has been proposed. When the element substrate is cut out from the wafer, a crack or a break may occur in the wafer or the element substrate in an intersection portion of the cutting lines where the recessed portion is not provided on the back surface of the wafer, and the quality and yield of the element substrate may be reduced. As a cause of the occurrence of the crack or break, for example, it is considered that a force is concentrated on an end of the recessed portion (a portion where the recessed portion is interrupted in the intersection portion) due to inclination of a dicing blade or variation in a cutting position during dicing.

SUMMARY

The present disclosure is directed to providing a method for manufacturing a liquid ejection head and a liquid ejection head in which the occurrence of chipping is reduced in dicing for cutting out an element substrate from a wafer and the element substrate is less likely to be cracked or broken.

According to an aspect of the present disclosure, a method for manufacturing a liquid ejection head including an element substrate having an ejection port forming member including an ejection port for ejecting liquid and an energy generating element for supplying energy for ejecting the liquid to the ejection port, includes preparing a wafer having the energy generating element and the ejection port forming member on a first surface, forming a recessed portion in a second surface which is a surface opposite to the first surface of the wafer, and cutting the wafer along a plurality of cutting lines provided on the first surface to form a plurality of element substrates, wherein the plurality of cutting lines includes a first cutting line extending in a first direction and a second cutting line extending in a second direction intersecting the first cutting line, wherein, when viewed from a direction perpendicular to the first surface of the wafer, the recessed portion is formed at a position overlapping the plurality of cutting lines except in an intersection portion of the first cutting line and the second cutting line, and wherein, in the intersection portion, the recessed portion is formed corresponding to only one of the first cutting line and the second cutting line.

Further features of the present disclosure will become apparent from the following description of exemplary embodiments with reference to the attached drawings.

DESCRIPTION OF THE EMBODIMENTS

Figure 1:
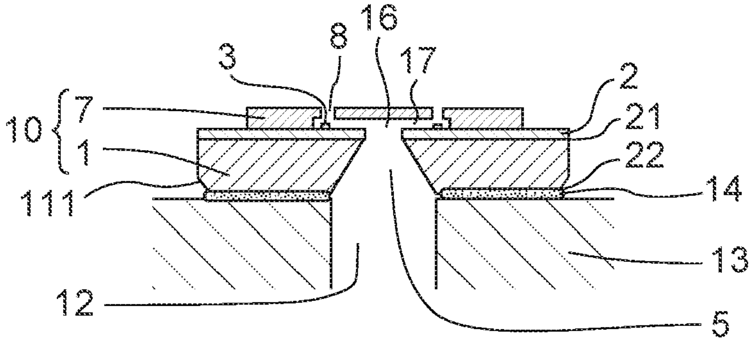
FIG. 1 is a cross-sectional view illustrating an example of a liquid ejection head according to the present disclosure.

Hereinafter, preferred exemplary embodiments of the present disclosure will be described with reference to the drawings. In the following description, the same reference numerals are given to configurations having the same functions, and repetition of the description may be omitted.

The method for cutting a silicon wafer based on the present disclosure is suitable for forming a liquid flow path of a liquid ejection head in a silicon substrate in a process of manufacturing a structure including the silicon substrate, particularly a device such as the liquid ejection head. Hereinafter, an example in which the present disclosure is applied to manufacturing of an element substrate used in a liquid ejection head will be described. Of course, the method of processing the liquid ejection head based on the present disclosure is not only used for manufacturing the substrate for the liquid ejection head, but also can be used for manufacturing and processing other structures using a silicon substrate.

FIG. 1 is a cross-sectional view illustrating a main part of a liquid ejection head according to the present disclosure. In a basic structure of the liquid ejection head, an element substrate 10 including a substrate 1 and an ejection port forming member 7 is bonded to a support member 13 via an adhesive 14. A surface layer 2 made of silicon oxide or silicon nitride is formed on a surface (first surface 21) of the substrate 1 made of silicon. A liquid supply path 5, which is a through hole, is formed in the substrate 1. The surface layer 2 is provided with a predetermined number of energy generating elements 3 (for example, electrothermal conversion elements or piezoelectric elements) that generate energy for ejecting liquid, such as ink, from an ejection port 8. The ejection port forming member 7 is provided so as to overlap the surface layer 2. The ejection port forming member 7 has the ejection port 8, and forms a common liquid chamber 16 and a pressure chamber 17 between the ejection port forming member 7 and the substrate 1. The common liquid chamber 16 communicates with the supply path 5 of the substrate 1 and communicates with a plurality of pressure chambers 17. The plurality of pressure chambers 17 is provided so that the energy generating elements 3 are positioned inside the respective pressure chambers 17. Further, the pressure chambers 17 are respectively provided with the ejection ports 8 open toward the outside from the pressure chambers 17. The supply path 5 of the substrate 1 communicates with an opening 12 of the support member 13. An inclined surface 111 is formed on a back surface (second surface 22), which is a surface opposite to the front surface of the substrate 1. The inclined surface 111 will be described below.

In the liquid ejection head, liquid, such as ink, is supplied from a tank (not illustrated) or the like to each pressure chamber 17 via the opening 12, the supply path 5, and the common liquid chamber 16. At least one of the plurality of energy generating elements 3 is selectively supplied with electric power via electric wiring (not illustrated) to be driven. In a case where an electrothermal conversion element is used as the energy generating element 3, the energy generating element 3 generates heat when driven, and the liquid located in the vicinity of the energy generating element 3 in the pressure chamber 17 is heated and generates bubbles, and a liquid droplet is discharged from the ejection port 8 by a bubbling pressure. In this case, the surface layer 2 made of a silicon oxide film or a silicon nitride film may also serve as a heat storage layer. In a case where a piezoelectric element is used as the energy generating element 3, the energy generating element 3 generates a mechanical vibration when driven, and the liquid located in the vicinity of the energy generating element 3 in the pressure chamber 17 receives pressure and is discharged from the ejection port 8 as a liquid droplet. In this way, an appropriate energy generating element 3 is selectively driven at an appropriate timing to eject a liquid droplet, and the liquid droplet is attached to a recording medium, such as paper, thereby characters, figures, patterns, and the like are formed on the recording medium.

Next, a method for manufacturing a liquid ejection head according to the present disclosure will be described. As illustrated in FIGS. 2A to 2G, a wafer 1 having a crystal plane orientation of <100> or <110> is prepared. The wafer 1 is a large-area disk as illustrated in FIG. 3A, is a member to be divided into a plurality of substrates 1 (see FIG. 1), and is denoted by the same reference numeral 1 as the substrate. The thickness of the wafer 1 is preferably about 400 to 800 μm. Here, FIG. 3A is a top view of the wafer 1 as viewed from a second surface 22 side. Cutting lines 9 are cutting lines for dividing the wafer 1 to obtain element substrates 10, and correspond to the outlines of the element substrates 10. The cutting lines 9 include cutting lines 9Y extending in a first direction (Y direction) and cutting lines 9X extending in a second direction (X direction) intersecting the first direction. An intersection portion of the cutting lines 9X and 9Y is referred to as an intersection portion 53. Recessed portions 11 are formed in the second surface 22 of the wafer at positions corresponding to the cutting lines 9. Each cutting line 9 is positioned at the center when the wafer 1 is diced, and the center of the recessed portion 11 substantially coincides with the cutting line 9. Formation of the recessed portions 11 in the wafer 1 will be described below.

Figure 2A:
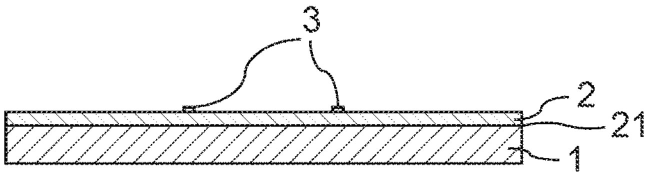
FIGS. 2A to 2G are cross-sectional views illustrating an example of a manufacturing process of the liquid ejection head according to the present disclosure.
Figure 3A:
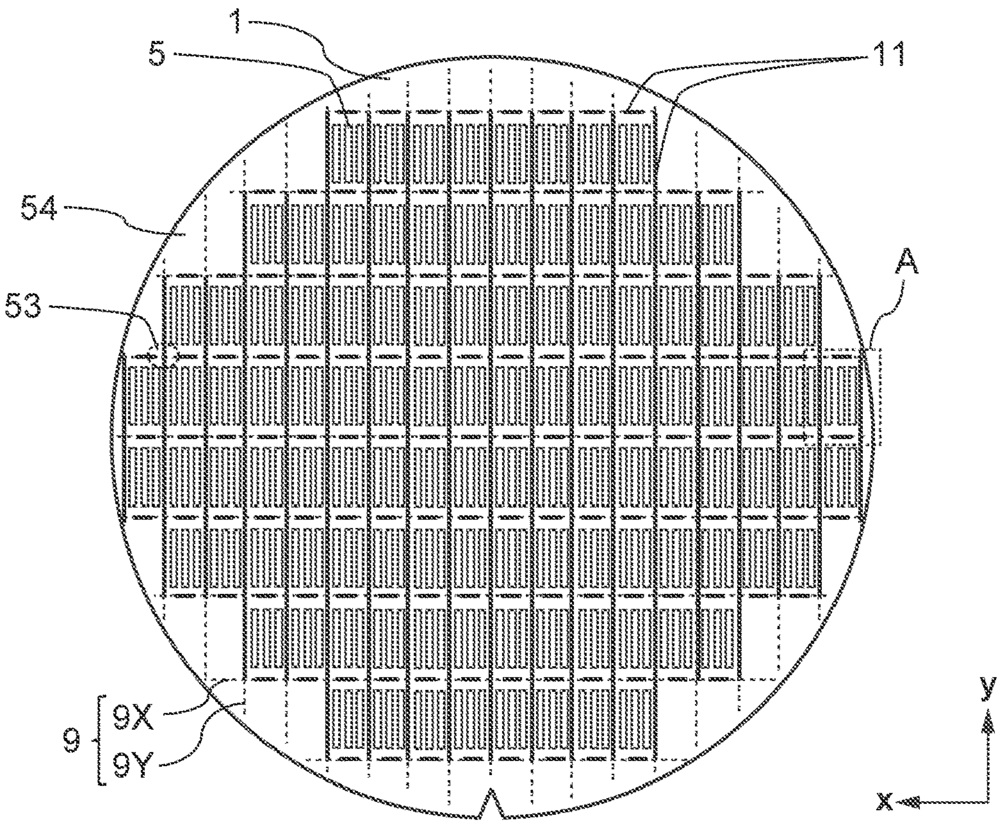
FIG. 3A is a plan view illustrating a part of the manufacturing process of the liquid ejection head illustrated in FIGS. 2A to 2G.

As illustrated in FIG. 2A, the surface layer 2 is formed on the first surface 21 of the wafer 1 using silicon oxide or silicon nitride. The surface layer 2 functions as a stop layer for anisotropic etching described below. A predetermined number of energy generating elements 3 are disposed at predetermined positions (positions corresponding to the pressure chambers 17) of the surface layer 2. For example, electrothermal conversion elements or a piezoelectric elements may be used as the energy generating elements 3. Each energy generating element 3 is connected to an electrode (not illustrated) for inputting a control signal for operating the energy generating element 3. In addition, for a purpose of improving durability of the energy generating element 3, various functional layers, such as a protective layer, may be further provided. In this case, the surface layer 2 made of silicon oxide or silicon nitride may be used as the protective layer.

Figure 2B:
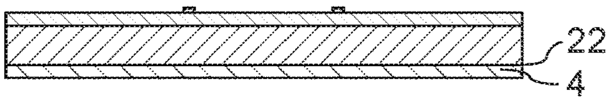
Figure 2C:
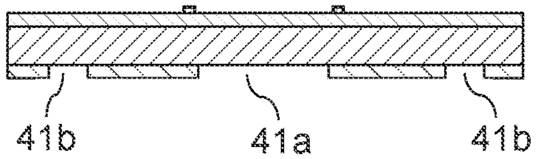

Next, as illustrated in FIG. 2B, a mask material 4 for forming the supply path 5 and the recessed portion 11 is provided on the second surface 22 of the wafer 1, and then, as illustrated in FIG. 2C, the mask material 4 is patterned to form a mask material opening 41. The mask material opening 41 includes a mask material opening 41*a* corresponding to the supply path 5 and a mask material opening 41*b* corresponding to the recessed portion 11 and positioned between adjacent element substrate forming portions. The mask material 4 functions as a mask during etching described below, and a silicon oxide film, a silicon nitride film, a polyetheramide resin film, or the like is desirably used. In a case where a silicon oxide film or a silicon nitride film is used as the mask material 4, the mask material 4 may be provided also on the first surface 21 of the wafer 1, as necessary. The mask material 4 on one surface of the wafer 1 may also serve as the above-described protective layer or the like. The mask material opening 41 can be accurately formed by using a double-sided mask aligner or the like, and the supply path 5 and the recessed portion 11 can be arranged with high positional accuracy with respect to the energy generating element 3. In addition, there is a method for forming the supply path 5 and the recessed portion 11 corresponding to the cutting line 9 at desired positions during the etching described below by using a silicon oxide film as the mask material 4 and modifying a surface of the silicon oxide film in a desired region of the mask material 4 by laser processing or the like.

Figure 2D:
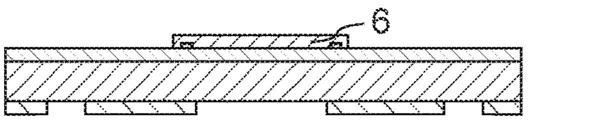

Next, as illustrated in FIG. 2D, a mold material 6 is formed on the wafer 1. First, a soluble resin is applied to the wafer 1 by a spin coating method, a direct coating method, a spray method, or the like, or a film of the soluble resin is formed on the wafer 1 by a roll coating method. Thereafter, the resin formed on the wafer 1 is patterned into a shape corresponding to the common liquid chamber 16 and the pressure chamber 17, thereby forming the mold material 6. As a method for forming the mold material 6, for example, a resist pattern is formed by applying a resist, exposing the resist to light, and developing the resist, and then the mold material 6 having a desired pattern is formed by etching using the resist as a mask. The mold material 6 may also be formed by using a photosensitive resin and directly patterning the photosensitive resin, or by attaching a resin film to the wafer 1.

Figure 2E:
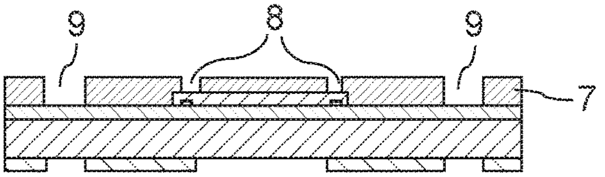

Next, as illustrated in FIG. 2E, the ejection port forming member 7 is formed so as to overlap the mold material 6.

The ejection port forming member 7 is a structural member of the liquid ejection head, and therefore is required to have properties such as high mechanical strength, heat resistance, adhesion to the wafer 1 (substrate 1), resistance to a liquid to be ejected, and not changing the property of the liquid. In particular, the ejection port forming member 7 is desirably formed of a resin material which is polymerized and cured by application of light or thermal energy and strongly adheres to the wafer 1. The ejection port forming member 7 is patterned to form ejection ports 8 and the cutting lines 9. The ejection ports 8 and the cutting lines 9 can be patterned simultaneously. The cutting lines 9 are provided at positions corresponding to the outlines of the individual element substrates 10 cut out from the wafer 1, and the wafer 1 provided with the ejection port forming member 7 is cut along the cutting lines 9, whereby the plurality of element substrates 10 is formed. In other words, the element substrate 10 includes the substrate 1 obtained by dividing the wafer 1 along the cutting lines 9, and the ejection port forming member 7 provided on the substrate 1. The cutting line 9 is a groove-shaped cutout portion provided in the resin material constituting the ejection port forming member 7, and may or may not completely penetrate the ejection port forming member 7. In a case where the cutting line 9 does not penetrate the ejection port forming member 7, the wafer 1 and the ejection port forming member 7 are simultaneously cut along the cutting line 9, whereby the element substrate 10 can be obtained. The ejection ports 8 and the cutting lines 9 can be formed by forming a resist pattern by photolithography technique and then performing etching using the resist pattern, in the same way as the patterning of the mold material 6. Alternatively, the ejection ports 8 and the cutting lines 9 may also be formed by using a photosensitive material and directly patterning the photosensitive material, or by attaching a resin film to the substrate 1.

Figure 2F:
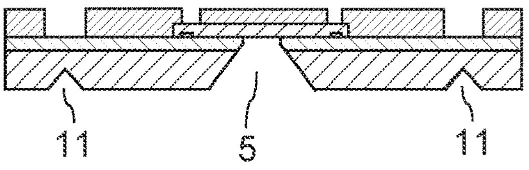

Next, the wafer 1 is immersed in a silicon anisotropic etching solution represented by a strong alkaline solution, and the supply path 5 and the recessed portions 11 are simultaneously formed by wet etching as illustrated in FIG. 2F. At this time, the surface of the wafer 1 is protected as required. Further, for example, tetramethylammonium hydroxide (TMAH) or potassium hydroxide (KOH) can be used as the etching solution. The anisotropic etching of silicon utilizes the difference in solubility depending on crystal orientation in an alkaline etching solution, and the progress of etching of the (111) plane which exhibits almost no solubility is slow. Thus, the shape of the supply path 5 varies depending on a plane orientation of the wafer 1. In a case where the wafer 1 is a silicon substrate having a plane orientation of <100>, the supply path 5 is formed at an inclination angle $\theta=54.7°$ with respect to the surface. In a case where the wafer 1 is a silicon substrate having a plane orientation of <110>, the supply path 5 is formed at an inclination angle $\theta=90°$ with respect to the surface. When the supply path 5 and the recessed portions 11 are simultaneously formed by wet etching, the shape and dimensions of the supply path 5 can be adjusted as necessary. For example, the shape and dimensions of the supply path 5 can be adjusted by forming a guide hole for the etching solution by performing laser processing or the like in a thickness direction of the wafer 1 in the mask material opening 41*a* for forming the supply path 5, and advancing wet etching for forming the supply path 5.

Figure 2G:
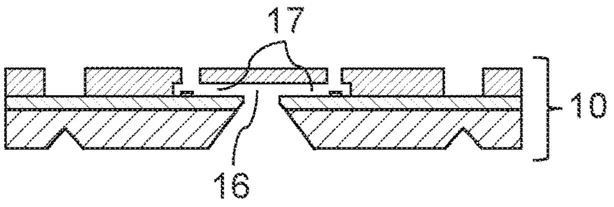

As the etching method, dry etching using an etching gas may be used in addition to wet etching using an etching solution. In this case, when it is difficult to simultaneously form the supply path 5 and the recessed portions 11 as in the case of wet etching, patterning of the mask material 4 and dry etching may be performed in a plurality of times, as necessary. Subsequently, as illustrated in FIG. 2G, the mold material 6 is eluted, and baking for thermally curing the resin is performed as necessary, whereby a basic structure of the element substrate 10 including the common liquid chamber 16, the pressure chamber 17, the energy generating element 3, and the ejection port 8 is formed.

Figure 4A:
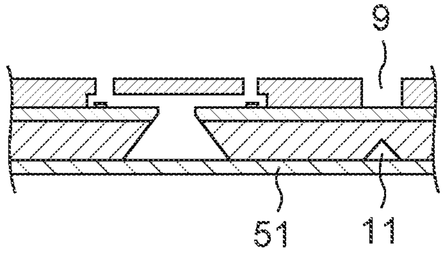
FIGS. 4A, 4B, and 4C are cross-sectional views illustrating processes subsequent to FIG. 2G in the method of manufacturing the liquid ejection head according to the present disclosure.
Figure 4B:
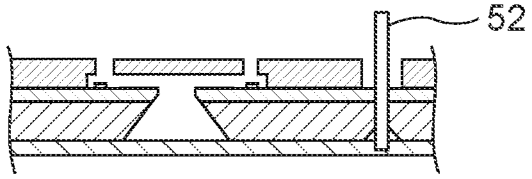
Figure 4C:
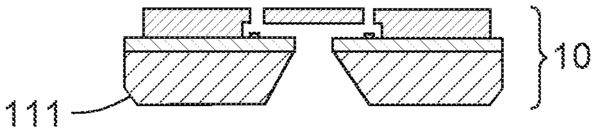

Subsequently, as illustrated in FIGS. 4A to 4C, a dicing process of cutting the wafer 1 along the plurality of cutting lines 9 to separate the wafer 1 into the individual element substrates 10 is performed. First, as illustrated in FIG. 4A, a dicing tape 51 is attached to the second surface 22 of the wafer 1 so that the element substrates 10 do not fall apart after cutting. The dicing tape 51 is generally obtained by forming an acrylic adhesive layer having adhesiveness on a resin base material, and the wafer 1 is held and fixed by the adhesive layer. Next, as illustrated in FIG. 4B, a dicing blade 52 is rotated and moved along the cutting line 9 positioned between adjacent element substrate units, thereby cutting the element substrate 10 into a desired size. At this time, when the center position of the recessed portion 11 corresponding to the cutting line 9 is shifted from the center position of the dicing blade 52 as viewed from a direction perpendicular to the surface of the wafer 1, the vicinity of the vertex of the recessed portion 11 remains without being removed and becomes a burr. Further, a phenomenon called chipping in which the burr is chipped occurs, and there is an issue in that the accuracy of the shape or the dimensions of the element substrate 10 is lowered and an amount of waste to be discarded increases. In addition, in the process of manufacturing the liquid ejection head, the chipped burr may enter the liquid flow path including the common liquid chamber 16 and the pressure chamber 17 and clog the ejection port 8 or the flow path, which may cause a defective ejection. Thus, it is desirable to perform dicing after performing alignment so that the center of the dicing blade 52 matches the center of the cutting line 9. In addition, it is desirable to adjust the cutting depth of the dicing blade 52 so that a part of the dicing tape 51 is cut to reliably cut the wafer 1, but the dicing tape 51 is not entirely cut to avoid the element substrates 10 from being separated from each other after the cutting.

The element substrates 10 as illustrated in FIG. 4C are obtained by the dicing process.

Stealth dicing may be used for cutting the cutting line 9 for which the recessed portion 11 is formed without interruption at the intersection portion 53 of the cutting lines 9X and 9Y, which will be described below. In this case, the wafer 1 is irradiated with a laser light from the first surface 21 side along the cutting line 9 to form an altered portion in the wafer 1. It is desirable to form the altered portion by scanning the wafer 1 along the cutting line 9 a plurality of times in accordance with the substrate thickness of the wafer 1 while changing the irradiation depth of the laser light. Then, the wafer 1 is expanded to apply stress to the altered portion, thereby a crack is generated in the altered portion, and the element substrates 10 are obtained.

Since the wafer 1 is cut so that the dicing blade 52 passes through the vertex of the recessed portion 11 at the time of dicing, as illustrated in FIG. 1, the inclined surface 111 derived from the recessed portion 11 is present on a side of the second surface 22 at an end portion of the element substrate 10. In other words, the element substrate 10 has the inclined surface 111 in an outer peripheral portion on the back surface.

Next, the cut element substrate 10 is fixed to the support member 13 with the adhesive 14, and a chip unit which is a main portion of the liquid ejection head as illustrated in FIG. 1 is formed. As the adhesive 14, it is desirable to use a thermosetting adhesive containing, as a main component, an epoxy resin having low viscosity, a low curing temperature, and ink resistance. An ink supply member (not illustrated), such as a tank, and an electrical connection member (not illustrated) for driving the energy generating element 3 are connected to the chip unit formed in this manner, and sealing for protecting an electrical connection portion is performed, whereby the liquid ejection head is completed.

A position to form the recessed portion 11 in the wafer 1 will now be described. If the recessed portion 11 is not formed at all in the intersection portion 53 of the cutting lines 9Y and 9X in order to stabilize the shape of the recessed portion 11, the wafer 1 and the substrate 1 may be cracked or broken at the intersection portion 53. As a cause of the occurrence of the crack or break, for example, it is considered that a force is concentrated on an end of the recessed portion (a portion where the recessed portion is interrupted in the intersection portion) due to inclination of a dicing blade or variation in a cutting position during dicing. Further, when the individual element substrates are picked up from the dicing tape, it is considered that a force is applied to a flat intersection portion where the recessed portion is not provided at an end portion of the back surface of the element substrate more than to other portions. As another cause, it is considered that, when the element substrate is electrically connected, a foreign substance or the like may be interposed between a stage of an apparatus used for the electrical connection and the element substrate, or the recessed portion and the foreign substance or a recessed or protruded portion on the stage may be brought into contact with each other. Thus, in the present disclosure, the recessed portion 11 is formed in the intersection portion 53 so as to correspond to only one of the cutting lines 9X and 9Y. In other words, one of the recessed portion 11 corresponding to the cutting line 9X and the recessed portion 11 corresponding to the cutting line 9Y is formed without interruption in the intersection portion 53, and the other thereof is formed with an interruption so as not to intersect with the other recessed portion. In other words, the recessed portion 11 is formed at a position overlapping the cutting line 9 except for the intersection portion of the cutting lines 9Y and 9X, and the recessed portion 11 is formed corresponding to only one of the cutting lines 9Y and 9X at the intersection portion 53. Accordingly, in the intersection portion 53, an effect of the present disclosure of preventing the occurrence of cracks and breaks while preventing the formation accuracy of the recessed portion 11 from becoming unstable is obtained.

Figure 3B:
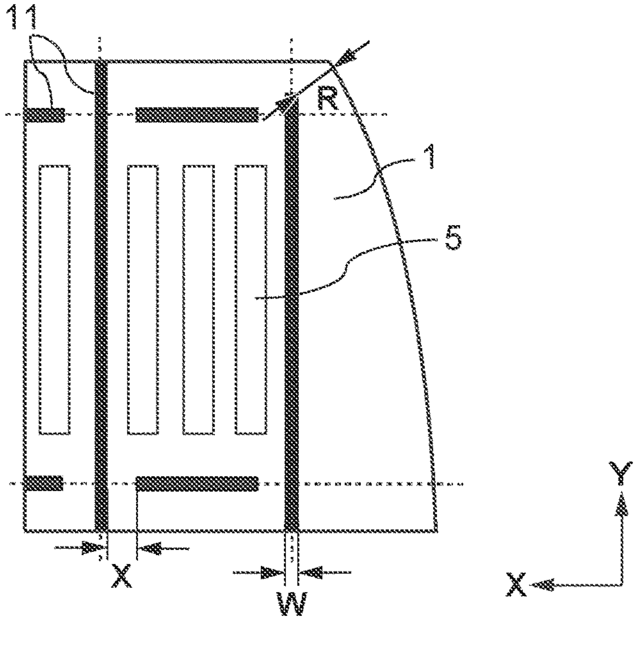
FIG. 3B is an enlarged plan view of FIG. 3A.

It is more desirable that the recessed portion 11 formed without interruption in the intersection portion 53 is formed at a position corresponding to the long side of the element substrate 10. As illustrated in FIGS. 3A and 3B, since the supply path 5 is formed in the long side direction of the element substrate 10, the recessed portion 11 is formed without interruption in the long side direction. Thus, the effect of preventing chipping during dicing is enhanced.

With the above configuration, an incidence of a crack or a break is reduced, and an improvement in quality and yield of the element substrate 10 can be expected. Specifically, in the cutting line 9 in which the recessed portion 11 is continuously formed without being divided, there is no interruption to the recessed portion 11, which may be a starting point of a crack or a break, and thus, the occurrence of a crack or a break can be prevented. In addition, in the formation of the recessed portion 11, since the recessed portion 11 corresponding to the cutting line 9 in one direction is interrupted at the intersection portion 53 and the recessed portion 11 extending in the other direction does not intersect therewith, the shape of the recessed portion 11 is stabilized, and the outer shape of the element substrate 10 is prevented from becoming unstable.

FIG. 3B illustrates an enlarged view of a region A in FIG. 3A. A width W of the recessed portion 11 is desirably formed to be, for example, about 100 to 300 μm, but may be appropriately adjusted in consideration of the width of the dicing blade 52, the processing accuracy, and the like. The width W refers to the thickness of the linear recessed portion. The width W of the recessed portion 11 corresponding to the first direction may be different from or the same as the width W of the recessed portion 11 corresponding to the second direction 32. In addition, in the intersection portion 53, in a case where a distance between the continuously provided recessed portion 11 and the discontinuously provided recessed portion 11 in the direction in which the recessed portion 11 is discontinuous is set to X, X is desirably about 100 to 3000 μm. More specifically, the distance X in the second direction between an end portion of the cutting line 9X in the second direction which is discontinuous in the intersection portion 53 and the cutting line 9Y in the first direction is desirably 100 μm or more and 3000 μm or less. However, the size of the distance X may be appropriately adjusted in consideration of the width of the dicing blade 52, the size of the element substrate 10, and the like. By providing a region (flat portion) where the recessed portion 11 is not formed in an outer peripheral edge portion 54 of the wafer 1, the strength of the wafer 1 can be maintained, and the wafer 1 can be prevented from being cracked even when the wafer 1 receives a minor impact or vibration. A shortest distance R from the outer periphery of the wafer 1 to the recessed portion 11 is desirably 2000 μm or more, but may be appropriately adjusted in consideration of a layout of the element substrate 10 on the wafer 1.

In FIGS. 3A and 3B, the recessed portion 11 is continuously formed at a position overlapping the cutting line 9Y in the Y direction (first direction), and is formed at a position overlapping the cutting line 9X in a portion other than the intersection portion 53 in the X direction (second direction). Thus, in the element substrate 10 obtained by dicing the wafer 1 illustrated in FIGS. 3A and 3B, the inclined surface 111 is provided on the entire side extending in the first direction on the back surface (second surface 22), and the inclined surface 111 is not provided at four corners of the element substrate 10 on the side extending in the second direction. Since the four corners on the back surface of the element substrate 10 have flat portions where inclined surfaces 111 are not provided, an effect of increased rigidity of the end portion of the element substrate 10 (substrate 1) can be obtained compared to a case where the inclined surfaces 111 are provided in the entire outer peripheral portion on the back surface of the element substrate 10. The present disclosure is not limited to the above-described exemplary embodiment. Various modifications and variations can be made without departing from the spirit of the present disclosure. Based on the above-described exemplary embodiments, examples according to the present disclosure will be described below.

EXAMPLES

First Example

Figure 5A:
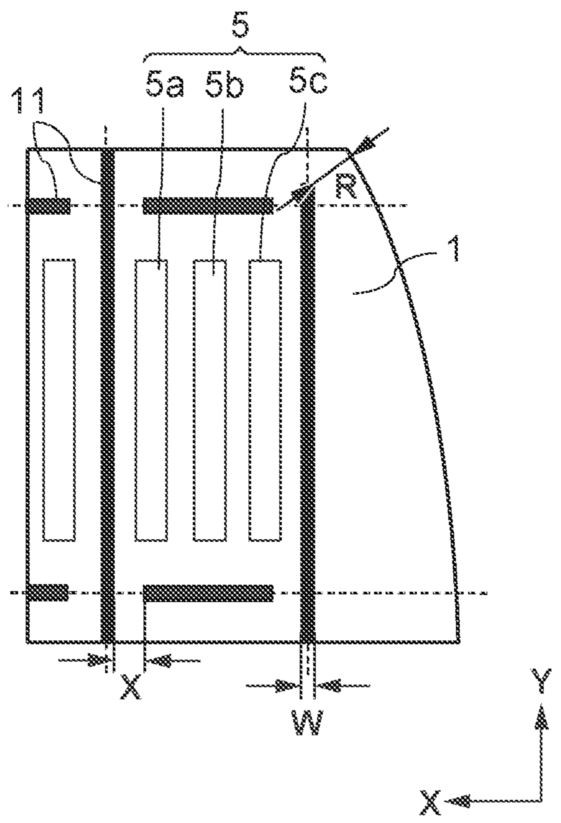
FIGS. 5A and 5B are plan views illustrating a part of the method for manufacturing the liquid ejection head according to a first example.

A first example is described below. In the description below, parts different from the above-described configuration will be mainly described, and the same parts as the above-described configuration are denoted by the same reference numerals, and descriptions thereof will be omitted. In the first example, the liquid ejection head was manufactured using a wafer 1 having a recessed portion with a structure illustrated in FIG. 5A, which is similar to that illustrated in FIG. 3B. FIG. 5A is a view of the wafer 1 as viewed from the second surface 22 side.

The size of the element substrate 10 formed on the wafer 1 was set such that the length of a long side (first direction) was 20000 μm and the length of a short side (second direction) was 6000 μm. Supply paths 5 are formed in three rows in the first direction in the element substrate 10. The size of the supply paths 5 on the second surface 22 was set such that the length in the first direction was 16000 μm and the length in the second direction was 1000 μm. When viewed from a direction perpendicular to the element substrate 10, the center of a central supply path 5*b* and the center of the element substrate 10 are arranged to coincide with each other, and left and right supply paths 5*a* and 5*c* are arranged such that respective center-to-center distances from the central supply path 5*b* in the second direction are 2000 μm. The width W of the recessed portion before cutting was 140 μm, and the distance X in the second direction in the vicinity of the intersection portion 53 was 500 μm.

Figure 5B:
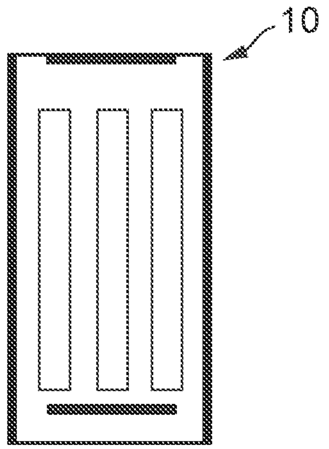

FIG. 5B is a view of the element substrate 10 cut out by dicing the wafer 1, as viewed from the second surface 22 side. The width of the dicing blade was 60 μm, the size of the element substrate 10 after cutting was 19940 μm in the first direction and 5940 μm in the second direction, and the width of the recessed portion after cutting was 40 μm. In the first example, the recessed portion 11 is formed only corresponding to the cutting line 9Y in the first direction in the intersection portion 53 of the cutting lines, and an effect of preventing an occurrence of chipping and preventing an occurrence of a crack and a break during dicing of the wafer 1 was obtained.

Second Example

Figure 6A:
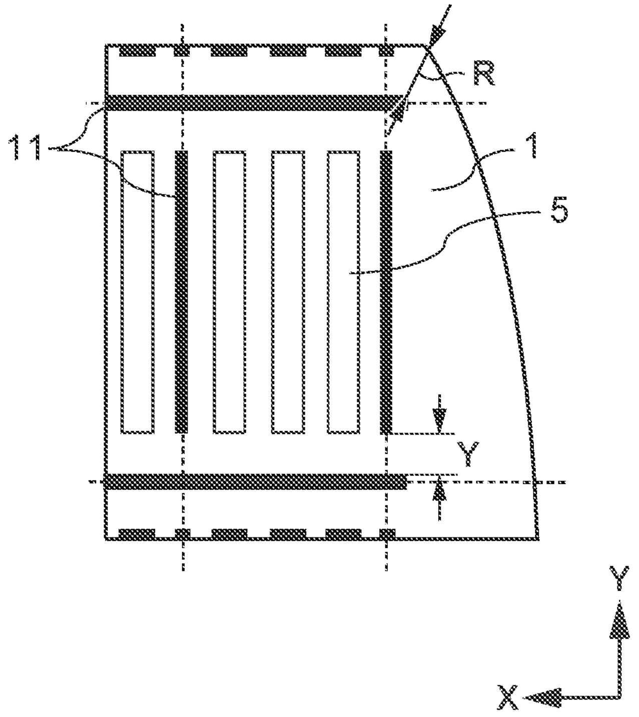
FIGS. 6A and 6B are plan views illustrating a part of the method for manufacturing the liquid ejection head according to a second example.
Figure 6B:
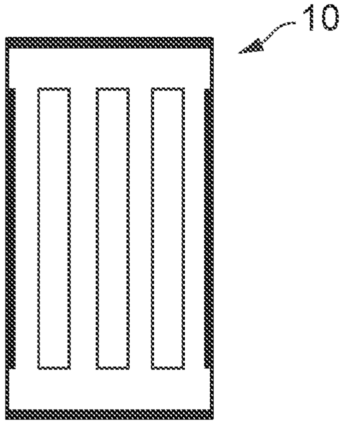

A second example is described below. In the description below, parts of the second example different from the first example will be mainly described, and descriptions of the same parts as those of the first example will be omitted. FIG. 6A is a view of a wafer 1 as viewed from the second surface 22 side. The configuration of the recessed portion 11 in the intersection portion 53 described in the first example is such that the recessed portion 11 is formed continuously in the first direction. In the second example, the configuration of a recessed portion 11 is such that the recessed portion 11 is formed continuously in the second direction. In the intersection portion 53, a distance Y between the continuously provided recessed portion 11 and the discontinuously provided recessed portion 11 in the direction in which the recessed portion 11 is discontinuous was set to 2000 μm. FIG. 6B is a view of the element substrate 10 cut out by dicing the wafer 1, as viewed from the second surface 22 side. In the second example, the recessed portion 11 is formed only corresponding to the cutting line 9X in the second direction in the intersection portion 53 of the cutting lines, and an effect of preventing an occurrence of chipping and preventing an occurrence of a crack and a break during dicing of the wafer 1 was obtained.

Third Example

Figure 7A:
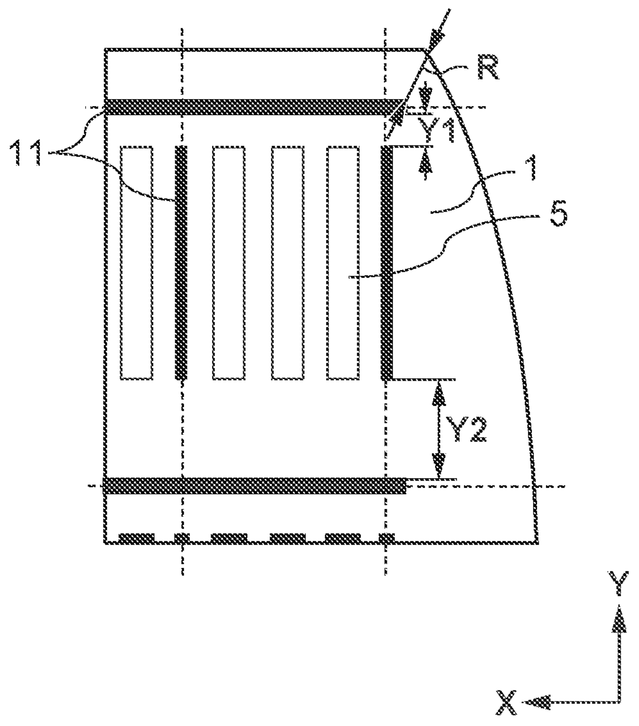
FIGS. 7A and 7B are plan views illustrating a part of the method for manufacturing the liquid ejection head according to a third example.
Figure 7B:
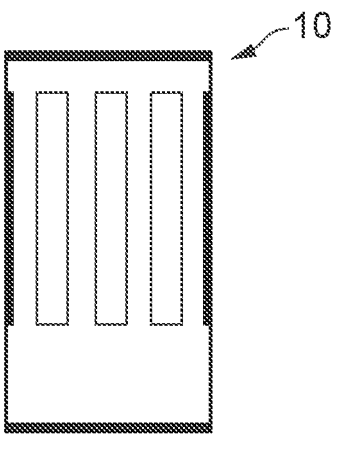

A third example is described below. In the description below, parts of the third example different from the above-described examples will be mainly described, and descriptions of the same parts as those of the first and second examples will be omitted. FIG. 7A is a view of a wafer 1 as viewed from the second surface 22 side. In the second example, the recessed portions 11 are formed symmetrically with respect to the center of the element substrate 10 in both the first direction and the second direction, whereas in the third example, the recessed portions 11 are arranged asymmetrically with respect to the Y direction so as to correspond to the length and an arrangement position of supply paths 5. In this manner, by not forming the recessed portions except for the vicinity of the supply paths 5, an effect of increasing the strength of the element substrate 10 is obtained. However, since the probability of chipping occurring when dicing is performed increases in a portion where the recessed portion 11 corresponding to the cutting line 9 is not formed, it is desirable to set a region where the recessed portion 11 is not formed in consideration of the shape and a positional relationship of the supply paths 5. In the third example, the size of the supply path 5 is set such that the length in the first direction is 12000 μm, and the center of the supply path 5 is arranged to be shifted by 2000 μm in the Y direction with respect to the center of the element substrate 10. Since the supply path 5 is arranged to be shifted from the center of the element substrate 10 in the Y direction, distances Y1 and Y2 in the intersection portion 53 are set to 2000 μm and 6000 μm, respectively, with the distance Y1 being the shorter one. FIG. 7B is a top view of the element substrate 10 cut out by dicing the wafer 1, as viewed from the second surface 22 side. Also in the third example, the recessed portion 11 is formed only corresponding to the cutting line 9X in the second direction in the intersection portion 53 of the cutting lines, and an effect of preventing an occurrence of chipping and preventing an occurrence of a crack and a break during dicing of the wafer 1 was obtained.

Fourth Example

Figure 8A:
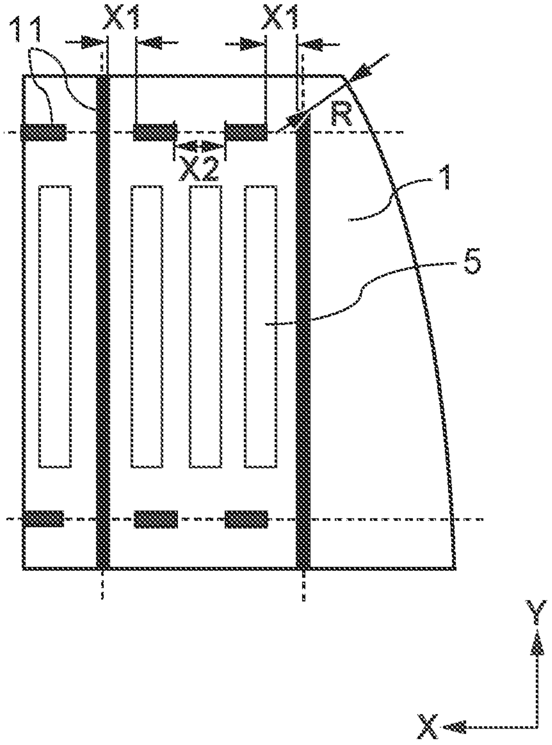
FIGS. 8A and 8B are plan views illustrating a part of the method for manufacturing the liquid ejection head according to a fourth example.
Figure 8B:
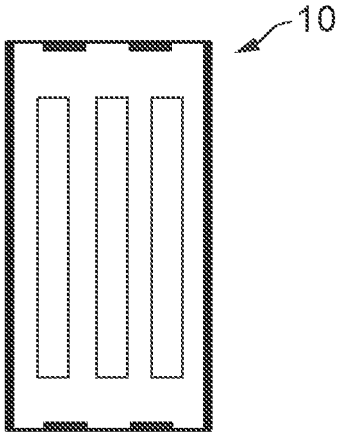

A fourth example is described below. In the description below, parts of the fourth example different from the above-described examples will be mainly described, and descriptions of the same parts as those of the first to third examples will be omitted. FIG. 8A is a top view of the wafer 1 as viewed from the second surface 22 side. In contrast to the configuration of the recessed portion 11 described in the first example, in the fourth example, the recessed portion 11 formed corresponding to the cutting line 9X in the X direction (second direction) is interrupted at a portion other than the intersection portion 53. This increases an area of the flat portion on the back surface of the element substrate 10, and thus an effect of increasing the strength of the element substrate 10 is obtained. However, since the probability of chipping occurring when dicing is performed increases in a portion where the recessed portion 11 corresponding to the cutting line 9 is not formed, it is desirable to set a region where the recessed portion is not formed in consideration of the shape and a positional relationship of the supply paths 5. In the fourth example, a distance X1 between the continuously provided recessed portion 11 in the intersection portion 53 and the discontinuously provided recessed portion 11 in the direction (X direction) in which the recessed portion 11 is discontinuous was set to 750 μm, and a distance X2 between the discontinuously provided recessed portions 11 extending in the X direction in the portion other than the intersection portion 53 was set to 1500 μm. A plurality of places where the recessed portion 11 is interrupted may be provided in accordance with the sizes, a positional relationship, and the like of the element substrate 10 and the supply path 5. FIG. 8B is a top view of the element substrate 10 cut out by dicing the wafer 1, as viewed from the second surface 22 side. Also in the fourth example, the recessed portion 11 is formed only corresponding to the cutting line 9Y in the first direction in the intersection portion 53 of the cutting lines, and an effect of preventing an occurrence of chipping and preventing an occurrence of a crack and a break during dicing of the wafer 1 was obtained.

Fifth Example

A fifth example is described below. In the description below, parts of the fifth example different from the above-described examples will be mainly described, and descriptions of the same parts as those of the first to fourth examples will be omitted. In the fifth example, as illustrated in FIGS. 5B and 6D, the liquid ejection head is formed in which the recessed portion 11 is continuously formed in only one of the first direction and the second direction of the cutting lines in the intersection portion 53. During dicing, the cutting line 9 in the direction in which the recessed portion 11 is continuously formed in the intersection portion 53 was cut using a dicing blade as in the same way as the first to fourth examples, and the cutting line 9 in the direction in which the recessed portion 11 is not formed in the intersection portion 53 was cut using stealth dicing. Also in the fifth example, an effect of preventing an occurrence of chipping and preventing an occurrence of a crack and a break during dicing of the wafer 1 was obtained.

The present disclosure provides a method for manufacturing a liquid ejection head in which an occurrence of chipping is prevented and in which a crack, a break, and the like of an element substrate hardly occurs during dicing for cutting out the element substrate from a wafer, and the liquid ejection head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004189, filed Jan. 16, 2023, which is hereby incorporated by reference herein in its entirety.

What is claimed is:

1. A method for manufacturing a liquid ejection head including an element substrate having an ejection port forming member including an ejection port for ejecting liquid and an energy generating element for supplying energy for ejecting the liquid to the ejection port, the method comprising:

preparing a wafer having the energy generating element and the ejection port forming member on a first surface;

forming a recessed portion in a second surface which is a surface opposite to the first surface of the wafer; and cutting the wafer along a plurality of cutting lines provided on the first surface to form a plurality of element substrates, wherein the plurality of cutting lines includes a first cutting line extending in a first direction and a second cutting line extending in a second direction intersecting the first cutting line, wherein, when viewed from a direction perpendicular to the first surface of the wafer, the recessed portion is formed at a position overlapping the plurality of cutting lines except in an intersection portion of the first cutting line and the second cutting line, wherein, in the intersection portion, the recessed portion is formed corresponding to only one of the first cutting line and the second cutting line, and wherein the recessed portion is formed corresponding to only the first cutting line in the intersection portion.

2. A method for manufacturing a liquid ejection head including an element substrate having an ejection port forming member including an ejection port for ejecting liquid and an energy generating element for supplying energy for ejecting the liquid to the ejection port, the method comprising:

preparing a wafer having the energy generating element and the ejection port forming member on a first surface;

forming a recessed portion in a second surface which is a surface opposite to the first surface of the wafer; and cutting the wafer along a plurality of cutting lines provided on the first surface to form a plurality of element substrates, wherein the plurality of cutting lines includes a first cutting line extending in a first direction and a second cutting line extending in a second direction intersecting the first cutting line, wherein, when viewed from a direction perpendicular to the first surface of the wafer, the recessed portion is formed at a position overlapping the plurality of cutting lines except in an intersection portion of the first cutting line and the second cutting line, and wherein, in the intersection portion, the recessed portion is formed corresponding to only one of the first cutting line and the second cutting line, and wherein the plurality of cutting lines is provided at positions corresponding to an outline of each of the element substrates.

3. The method according to claim 1, wherein the first cutting line corresponds to a long side of the element substrate obtained by cutting the wafer.

4. The method according to claim 1, wherein a distance in the second direction between an end portion of the second cutting line and the first cutting line is 100 micrometer (μm) or more and 3000 μm or less.

5. The method according to claim 1, wherein forming the recessed portion includes forming the recessed portion by wet etching.

6. The method according to claim 5, wherein the element substrate includes a supply path for supplying the liquid to the ejection port forming member, and the supply path and the recessed portion are formed simultaneously.

7. The method according to claim 1, wherein a cutting line of the plurality of cutting lines is a groove-shaped cutout portion provided in a resin material constituting the ejection port forming member.

8. The method according to claim 1, wherein cutting the wafer includes cutting the wafer by a dicing blade.

9. The method according to claim 1, wherein cutting the wafer includes cutting the wafer along the first cutting line by a dicing blade, and cutting the wafer along the second cutting line by stealth dicing.

10. A method for manufacturing a liquid ejection head comprising:

an element substrate having, on a first surface, an ejection port forming member including an ejection port for ejecting liquid and an energy generating element for supplying energy for ejecting the liquid to the ejection port, wherein the element substrate has an inclined surface in an outer peripheral portion on a second surface that is a surface opposite to the first surface, wherein the inclined surface is provided on an entire side of the element substrate extending in a first direction, and wherein the inclined surface is not provided on a side corresponding to a side extending in a second direction intersecting the side at four corners of the element substrate, the method for manufacturing the liquid ejection head comprising:

preparing a wafer having the energy generating element and the ejection port forming member on a first surface;

forming a recessed portion in a second surface which is a surface opposite to the first surface of the wafer; and cutting the wafer along a plurality of cutting lines provided on the first surface to form a plurality of element substrates, wherein the plurality of cutting lines includes a first cutting line extending in a first direction and a second cutting line extending in a second direction intersecting the first cutting line, wherein, when viewed from a direction perpendicular to the first surface of the wafer, the recessed portion is formed at a position overlapping the plurality of cutting lines except in an intersection portion of the first cutting line and the second cutting line, wherein, in the intersection portion, the recessed portion is formed corresponding to only one of the first cutting line and the second cutting line, and wherein the plurality of cutting lines is provided at positions corresponding to an outline of each of the element substrates.

11. The method according to claim 10, wherein the side extending in the first direction is a long side of the element substrate.

12. A method for manufacturing a liquid ejection head comprising:

an element substrate having, on a first surface, an ejection port forming member including an ejection port for ejecting liquid and an energy generating element for supplying energy for ejecting the liquid to the ejection port, wherein the element substrate has an inclined surface in an outer peripheral portion on a second surface that is a surface opposite to the first surface, wherein the inclined surface is provided on an entire side of the element substrate extending in a first direction, and wherein the inclined surface is not provided on a side corresponding to a side extending in a second direction intersecting the side at four corners of the element substrate, the method for manufacturing the liquid ejection head comprising:

preparing a wafer having the energy generating element and the ejection port forming member on a first surface;

forming a recessed portion in a second surface which is a surface opposite to the first surface of the wafer; and cutting the wafer along a plurality of cutting lines provided on the first surface to form a plurality of element substrates, wherein the plurality of cutting lines includes a first cutting line extending in a first direction and a second cutting line extending in a second direction intersecting the first cutting line, wherein, when viewed from a direction perpendicular to the first surface of the wafer, the recessed portion is formed at a position overlapping the plurality of cutting lines except in an intersection portion of the first cutting line and the second cutting line, wherein, in the intersection portion, the recessed portion is formed corresponding to only one of the first cutting line and the second cutting line, and wherein the plurality of cutting lines is provided at positions corresponding to an outline of each of the element substrates, and wherein the recessed portion is formed corresponding to only the first cutting line in the intersection portion.

13. The method according to claim 12, wherein the side extending in the first direction is a long side of the element substrate.

* * * * *